July 8, 1958   A. C. GUMPLO   2,842,268
CHART-HOLDING MEANS
Filed Dec. 4, 1953
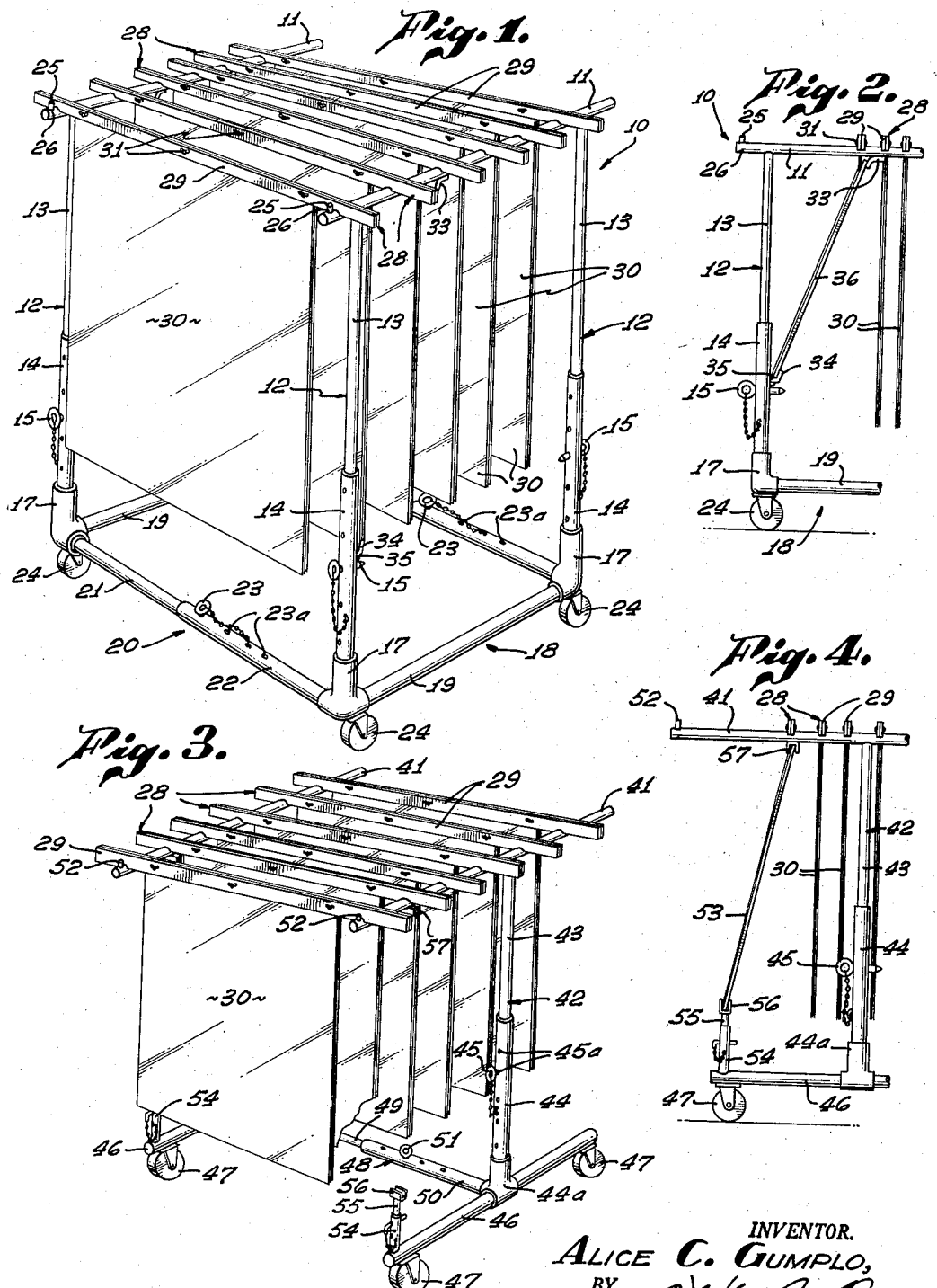
INVENTOR.
ALICE C. GUMPLO,
BY
ATTORNEY.

United States Patent Office 2,842,268
Patented July 8, 1958

2,842,268

CHART-HOLDING MEANS

Alice C. Gumplo, Pasadena, Calif.

Application December 4, 1953, Serial No. 396,176

4 Claims. (Cl. 211—45)

This invention relates to an educational visual aid device for use in schools and meetings wherein presentations utilizing charts and the like are made. The invention more particularly relates to a portable lightweight support means for a plurality of charts to be used in such a presentation wherein the sequential positioning of the charts is facilitated.

Prior proposed devices for holding charts for presenting material to groups of people such as a class of school children or a sales meeting have included a stand on top of which is carried a plurality of spaced rings to which are attached a plurality of charts. The charts normally hang downwardly from the rings and after the top chart is explained, this chart is usually folded upwardly and over the top of the stand. Successive charts are likewise folded over the top of the stand. In another form of prior proposed chart-holding device, an easel of tripod form is provided in which the charts are placed against a suitable stiff backing member carried by the easel. In this instance, the charts after use were removed from the easel and laid upon a separate surface.

The prior proposed chart-holding means had many disadvantages, among which were the non-portability of the chart-holding device so that it could not be readily adjustably moved to face various portions of the group viewing the chart. Another disadvantage was the inconvenience in handling charts supported in the manner described above. In the ring type after two or three charts had been folded over the top of the stand, the remaining charts folded thereover would tend to unfold and slip down over the chart under consideration. Another disadvantage was that in such prior chart holders, the stands were not steady and stable. A further disadvantage of such prior proposed chart-holding means was that the instructor or the person explaining the chart spent much of his time properly positioning the chart for viewing by a group.

The present invention contemplates a novel educational visual aid device for holding charts and the like which obviates the disadvantages of prior proposed chart-holding means.

The primary object of this invention is to disclose and provide an educational visual aid device for holding charts wherein a plurality of charts may be readily and conveniently supported for sequential positioning before an audience.

An object of this invention is to disclose and provide such a novel chart-holding means wherein the plurality of charts supported thereby may be conveniently slidably advanced to display position.

Another object of this invention is to disclose and provide a novel chart-holding means wherein means are provided for rigidly supporting or backing a compliant paper sheet in display position so as to permit writing thereon.

A further object of this invention is to disclose and provide a chart-holding means as mentioned above wherein the frame structure is readily disassembled for transportation thereof and which, in disassembly, will require a minimum of storage space.

A still further object of this invention is to disclose and provide a novel chart-holding means which is readily adjustable both vertically and laterally to charts of different sizes.

Generally speaking, this invention contemplates a novel visual aid device for supporting and holding a plurality of selected charts wherein the forwardmost chart is readily viewed by an audience which it faces, wherein a flannel sheet for electrostatically mounting various articles thereon may be used therewith, and wherein means are provided for permitting drawing and writing on the foremost chart or sheet of paper supported by the visual aid device.

The device of this invention generally comprises a pair of parallel spaced-apart support bars, each carried by an upstanding extensible post for permitting vertical adjustment to a desired height and a base means removably connected to said posts. The base means supporting said posts may be interconnected by extensible transverse members to afford lateral adjustment to accommodate charts of different width. The device is mounted on roller means for facilitating positioning in any direction. Means are provided on the bars and the adjacent support posts or base members for removably carrying a stiff rigid flat plate behind the forwardmost chart for supporting the entire area of the chart to permit writing thereon.

Other objects and advantages of this invention will be readily apparent upon the following description of the drawings in which exemplary embodiments of this invention are shown.

In the drawings:

Fig. 1 is a perspective view of one embodiment of this invention.

Fig. 2 is a fragmentary side view of the device shown in Fig. 1.

Fig. 3 is a perspective view of a different embodiment and construction of the device of this invention.

Fig. 4 is a fragmentary side view of Fig. 3.

In the embodiment of this invention shown in Fig. 1, a visual aid device generally indicated at 10 comprises a frame means including a pair of spaced-apart parallel horizontal bars or rods 11. The bars 11 may be made of any suitable length and of any suitable material, such as a tubular metal stock or wood stock of any suitable section. Each bar 11 may be carried by a pair of longitudinally spaced upstanding posts 12. Each post 12 includes a top post element 13 connected to bar 11 in any suitable manner. Each post 12 includes a post element 14 having an inner diameter sufficient to slidably and telescopically receive the end of upper post element 13. The telescopic arrangement of the post elements 13 and 14 afford vertical adjustability of the bars 11 so that they may be raised to any suitable selected height for convenient viewing by a group of persons.

Means for securing the post elements 13 and 14 in selected relationship may include a plurality of alignable ports in the post element 13 and post element 14. A suitable pin 15 may be readily inserted through said ports when in alignment in order to prevent relative movement between elements 13 and 14.

Each post element 14 may be carried in an upwardly opening socket member 17 provided on base means generally indicated at 18, the lower portion of post element 14 being slidably inserted within socket 17. The height of socket 17 is sufficient to adequately support the posts 12.

The base means 18 includes a longitudinally extending base member 19 which lies parallel to bar 11 and therebelow. The base member 19 may be of any selected length in order to provide suitable stability to the device. At each end of base member 19 may be connected in any suitable manner a lateral member 20 which extends between opposed base members and may be connected thereto adjacent the bottom of posts 12. Each lateral member 20 includes a lateral element 22 which may be of sufficient inner diameter to telescopically and slidably receive a lateral element 21 whereby lateral adjustment of the spacing between bars 11 is afforded. The telescopically arranged elements 21 and 22 may be secured by pins 23 adapted to extend through aligned ports 23a arranged in longitudinal spaced relation in the elements 21 and 22.

Roller means affording easy portability of the device so that it can be readily moved for presentation of charts in any direction may comprise a pair of casters 24 secured in longitudinal spaced relation to each base member 19. Obviously other roller means may be used in place of the casters shown.

Each bar 11 is provided at its forwardmost extremity with a stop pin 25 adapted to be carried in aligned openings 26 in the end of each bar 11. Stop pins 25 position and locate the forwardmost position of a chart 28.

Each chart 28 may comprise a transversely extending separable multi-ply support element 29 provided with a downwardly facing notch adjacent each end for complementary seating engagement on bars 11. A sheet 30 of the chart may be secured to member 29 between the plies thereof by any suitable means such as wing nut and bolt assemblies 31.

It will thus be noted that the arrangement of bars 11 and post 12 which lie in parallel spaced vertical planes define a longitudinally extending normally unobstructed chart-storing zone therebetween and within which may be accommodated a plurality of charts 28 in series. It should be noted that the zone is open at opposite ends and that the forwardmost chart being displayed may be positioned against the stop pins 25.

When explanation and demonstration of the forwardmost chart on display is completed, such chart may be readily lifted from bars 11 and moved forwardly to clear the front ends of bars 11 and then moved rearwardly along the outside of the device for entering said chart-holding zone from the rear of the device. Such chart may be hung on the rear portion of bars 11.

The second chart to be presented may be slidably advanced along bars 11 to display position against stop pins 25. The other charts 28 not in use may be advanced forwardly by sliding the charts on the bars either singly or in a group or groups.

It is understood that bars 11 and base member 19 may be made with telescopically arranged extensible portions so as to increase the chart-storing capacity if desired.

Means for rigidly supporting or backing a forwardmost compliant sheet 30 of a chart 28 in order to permit writing thereon may be provided by a depending lug 33 connected to the lower side of each bar 11 adjacent the forwardmost post 12. Each forwardmost post element 14 may include an upwardly directed finger 34 adapted to be secured in any one of a plurality of selected holes 35 in the rearwardly facing portion of post element 14. A rigid stiff rectangular smooth-surfaced plate 36 of suitable material such as sheet metal, pressed paper board and the like and of suitable dimensions may be then slidably mounted on the fingers 34 and the depending lugs 33. Thus when the plate is in position and spans the zone occupied by the charts, the forwardmost chart may be moved rearwardly until the paper sheet thereon lays against the forward surface of the plate. It will thus be readily apparent that a rigid surface is provided for writing on such a sheet, said sheet may be readily written upon because of the smooth surfaced rigid plate therebehind.

In the embodiment of this invention shown in Figs. 3 and 4, the frame means is constructed slightly differently and may include parallel spaced-apart longitudinally coextensive bars 41 adapted to support between and along their length a plurality of charts 28. Each bar 41 may be carried by a central post 42 including telescopically arranged elements 43 and 44. Pins 45 cooperable with alignable openings 45a in the elements 43 and 44 afford vertical adjustability of each bar 41 as in the prior embodiment. The lower post element 44 may be removably inserted in a socket 44a which is carried by a longitudinally extending base member 46 lying in the same plane as bar 41. It will be noted that the bar 41 and post 42 are in the shape of a T and may be removed from the base member 46 for purpose of transportation and storage.

The base member 46 may carry suitable roller means 47 in the form of castors and the like. The castors are longitudinally spaced apart and may be readily mounted in openings provided therefor in the base member.

The parallel base members 46 may be interconnected by a central lateral member 48 including elements 49 and 50 telescopically arranged to afford lateral adjustability of the spacing of parallel bars 41. Pins 51 may secure the elements 49 and 50 in selected telescopic arrangement.

The forwardmost end of each bar 41 may be provided with an upstanding chart stop element 52 to position the chart being displayed.

Means for mounting a stiff smooth surfaced plate 53 to permit writing on a chart being displayed may comprise a pair of relatively small telescopically arranged tubes 54 and 55 carried at the forwardmost end of each base member 46. The upper tube 55 may carry an upwardly facing U-shaped member 56 adapted to receive lower edge portions of plate 53. The end portion of bar 41 above the tubular elements may be provided with a depending U-shaped element 57 arranged to receive a top edge margin of such a plate. Thus plate 53 may be readily secured behind the chart being displayed by suitable adjustment of the tubular telescopic members 54 and 55 carried by the base members 46.

It is understood that in place of charts bearing illustrations of material to be presented or consisting of simply plain sheets of paper, a sheet of flannel material may be readily supported by the chart supporting elements 29 and positioned against a backing plate such as 36 or 53. The sheet of flannel provides a surface capable of storing an electrostatic charge whereby children may fasten, as by pressing, various paper objects to the flannel.

It will be readily understood from the above description that the visual aid chart-holding device of this invention may be readily assembled and disassembled for purposes of demonstration, storage and for transportation thereof. The base members and the upstanding post means are simply and readily removably connected. The chart accommodating zone may be readily adjustable vertically and laterally to different chart sizes and particularly to a selected height which will permit convenient viewing by an audience. The chart-holding zone may be readily increased or decreased by providing the support bars 11 and base members 19 with telescopically arranged extensible portions. The charts are obviously conveniently handled and readily positioned thereby facilitating their manual manipulation by the individual explaining and presenting said charts. The visual aid device is readily provided with stiff plate means whereby the device may be used with blank sheets of paper 30 held by the chart support elements for permitting individual illustrations of desired material as by drawing or writing on the sheets of paper.

It is understood that the stiff plate means may be provided with a slate surface so that it may be used as a blackboard. A portable blackboard is thus provided which may be of selected width and height. Many other uses may be made of the device of this invention and it is understood that those mentioned above are exemplary only.

It will be understood by those skilled in the art that various modifications and changes may be made in the visual aid device described above that fall within the spirit of the invention, and all such changes and modifications coming within the scope of the appended claims are embraced thereby.

I claim:

1. A portable visual aid device for supporting charts and the like to facilitate presentation thereof comprising, in combination: a frame means comprising a pair of parallel spaced apart longitudinal support bars; a pair of longitudinal base members lying parallel to said bars; upstanding post means connecting said bars and said base members; lateral means interconnecting said base members whereby an unobstructed longitudinally extending zone open at opposite ends for accommodating chart means adapted to be supported by said bars is defined by said bars, said post means and said lateral means; roller means carried by said base members; a rigid flat plate extending across said zone at a forward position thereof; and means carried by said bars and means positioned above said base members for slidably and removably supporting said plate.

2. A device as claimed in claim 1 wherein said means positioned above said base members for supporting said plate include a vertically, adjustably positioned element for accommodating said plate when said vertical adjustment of said bars is made.

3. A portable visual aid device for supporting charts and the like comprising, in combination: parallel base members provided with roller means; upstanding post means connected to said base members; a horizontal support bar connected to the top of the post means associated with each base member, said post means and said horizontal bars supported thereby defining an unobstructed, longitudinally extending zone open at opposite ends; lateral means adjustably interconnecting said base members below said zone for adjusting the width thereof; said post means including adjustable means for varying the height of said zone; and means to support a rigid plate at one end of said zone, said support means including a vertically adjustable plate positioning element supported above each base member and a depending plate positioning element carried by each support bar.

4. A portable device for facilitating demonstration of charts and the like comprising: at least two pair of parallel base members provided with roller means; the members of one pair being disposed normal to the members of the other pair upstanding post means connected to said base members; a horizontal support bar carried at the top of the post means associated with each base member, said post means and said horizontal bars defining an unobstructed longitudinally extending zone open at opposite ends; at least one pair of said parallel base members including adjustable means for adjusting one dimension of said zone; said post means including adjustable means for varying the vertical dimension of said zone; and means to support a rigid plate within said zone, said support means including adjustable plate positioning means supported from said base members.

References Cited in the file of this patent

UNITED STATES PATENTS

| 516,347 | Chamberlin | Mar. 13, 1894 |
| 527,809 | Reading | Oct. 23, 1894 |
| 843,220 | Losee | Feb. 5, 1907 |
| 1,248,710 | Quiram | Dec. 4, 1917 |
| 1,912,864 | Stannard | June 6, 1933 |

FOREIGN PATENTS

| 506,228 | Germany | Aug. 30, 1930 |